United States Patent
Nguyen et al.

(10) Patent No.: US 6,558,139 B2
(45) Date of Patent: May 6, 2003

(54) BEARINGS WITH HARDENED ROLLING ELEMENTS AND POLYMERIC CAGES FOR USE SUBMERGED IN VERY LOW TEMPERATURE FLUIDS

(75) Inventors: Dan Nguyen, Houston, TX (US); Gary Templin, Spring, TX (US); Brannon Baskin, Magnolia, TX (US)

(73) Assignee: Chemical Seal & Packing, Inc.

( * ) Notice: Subject to any disclaimer, the term of this patent is extended or adjusted under 35 U.S.C. 154(b) by 92 days.

(21) Appl. No.: 09/733,257

(22) Filed: Dec. 8, 2000

(65) Prior Publication Data

US 2002/0094286 A1 Jul. 18, 2002

(Under 37 CFR 1.47)

Related U.S. Application Data

(63) Continuation-in-part of application No. 09/110,581, filed on Jul. 6, 1998, now Pat. No. 6,183,219, which is a continuation-in-part of application No. 08/566,919, filed on Dec. 4, 1995, now abandoned.

(51) Int. Cl.[7] ............................................. F04B 17/00
(52) U.S. Cl. .................... 417/420; 417/423.12; 415/229
(58) Field of Search ................................. 417/373, 420, 417/423.12, 901; 384/192, 527, 907.1; 415/111, 229

(56) References Cited

U.S. PATENT DOCUMENTS 3,199,934 A * 8/1965 Van Wyk ..................... 508/103
3,500,525 A * 3/1970 Glenn .......................... 364/286
3,561,828 A * 2/1971 Glenn .......................... 384/561

(List continued on next page.)

OTHER PUBLICATIONS

Nasa Tech Brief, Silicon Nitride Balls For Cryogenic Bearings, Jul. 1990, vol. 14, Issue 7, p. 63.*
Magneti Permanenti Industriali SRL, Feb. 14, 2002, Ferrite_Magnete_Ceramico_immagine, 2 pages.*
Salem Specialty Ball Company, Feb. 14, 2002, 440 Stainless Steel Balls, 3 pages.*
Encylopedia Britannica Online, Feb. 14, 2002, Polymer, 2 pages.*
www.ngandhi.com, Feb. 14, 2002, Stainless Steel Balls, 3 pages.*
D. Sriram, Jun. 2000, MRS, Anisotropic thermal expansion of barium hexaferrite using dynamic high–temperature x–ray diffraction., 1 page.*
Merriam Webster Collegiate Dictionary, Feb. 15, 2002, Orifice, 1 page.*
"Nylon Parts for Ball Bearings," F.W.. Recknagel, Product Engineering, pp. 119–123 of Feb., 1952.

*Primary Examiner*—Charles G. Freay
*Assistant Examiner*—John F Belena
(74) *Attorney, Agent, or Firm*—Haynes and Boone; John W. Montgomery

(57) ABSTRACT

A self lubricating bearing for use submerged in cryogenic fluids. The self-lubricating bearing comprises hardened races, hardened rolling elements and polymeric retainers or cages. More particularly, the rolling elements may be hardened balls, and the polymeric cages may include PEEK. In particular a bearing for self lubricated use in seal-less, magnetic drive pump for pumping fluids at very low temperatures and cryogenic temperatures below about −100 degrees centigrade such as liquid nitrogen and temperatures below about −150 degrees centigrade such as liquefied natural gas (LNG). An environment for submerged use of such a bearing may be a magnetically driven cryogenic pump with a housing having an intake and exhaust with a back plate mounted therein in which a shaft is journaled in self-lubricating bearings having hardened stainless steel or ceramic balls, stainless steel races and polymeric retainers or cages for retaining the balls for rolling contact in the races. An impeller is mounted on the first end and a first magnet is mounted on the second end of the shaft.

20 Claims, 4 Drawing Sheets

U.S. PATENT DOCUMENTS

| | | | |
|---|---|---|---|
| 4,325,757 A | | 4/1982 | Jandeska, Jr. et al. ...... 148/103 |
| 4,531,372 A | | 7/1985 | Slabaugh et al. ............ 62/55.5 |
| 4,578,956 A | | 4/1986 | Young ............................. 62/6 |
| 4,667,477 A | * | 5/1987 | Matsuda et al. ............ 417/901 |
| 4,680,936 A | | 7/1987 | Sarwinski et al. .............. 62/45 |
| 4,722,661 A | | 2/1988 | Mizuno ...................... 417/360 |
| 4,813,342 A | | 3/1989 | Schneider et al. ............ 92/207 |
| 4,849,017 A | | 7/1989 | Sahashi et al. ................ 75/245 |
| 4,850,818 A | | 7/1989 | Kotera ....................... 417/366 |
| 4,963,040 A | * | 10/1990 | Takebayashi et al. .... 384/907.1 |
| 4,997,297 A | | 3/1991 | Blount ........................ 384/585 |
| 4,998,863 A | * | 3/1991 | Klaus .................... 417/423.12 |
| 5,017,102 A | | 5/1991 | Shimaguchi et al. ........ 417/420 |
| 5,121,605 A | * | 6/1992 | Oda et al. ................. 417/423.7 |
| 5,201,642 A | * | 4/1993 | Hinckley .................... 417/420 |
| 5,207,981 A | | 5/1993 | Hanaue et al. .............. 420/416 |
| 5,209,652 A | | 5/1993 | Fischer et al. .............. 417/409 |
| 5,230,570 A | | 7/1993 | Bursey, Jr. et al. ......... 384/527 |
| 5,248,245 A | * | 9/1993 | Behnke et al. .............. 417/420 |
| 5,263,829 A | | 11/1993 | Gergets ...................... 417/420 |
| 5,271,679 A | * | 12/1993 | Yamazumi et al. ......... 384/527 |
| 5,284,394 A | * | 2/1994 | Lemelson ................ 384/907.1 |
| 5,291,739 A | | 3/1994 | Woods et al. ................ 62/48.1 |
| 5,317,879 A | | 6/1994 | Goldberg et al. ............ 62/51.1 |
| 5,833,373 A | * | 11/1998 | Ueno et al. ................. 384/527 |
| 5,887,985 A | * | 3/1999 | Loree, II et al. ......... 384/907.1 |
| 6,143,425 A | * | 11/2000 | Tanaka et al. .............. 384/490 |

* cited by examiner

BEARINGS WITH HARDENED ROLLING ELEMENTS AND POLYMERIC CAGES FOR USE SUBMERGED IN VERY LOW TEMPERATURE FLUIDS

CROSS-REFERENCE TO RELATED APPLICATIONS

This is a continuation in part of and co-owned U.S. patent application Ser. No. 09/110,581 filed, Jul. 6, 1998, that was a continuation in part of U.S. application Ser. No. 08/566,919 filed Dec. 4, 1995, now abandoned, the priority dates of which are relied upon for all legitimate purposes herein.

TECHNICAL FIELD OF THE INVENTION

The present invention relates to a bearing for use submerged in fluids at very low temperatures. In more detail, the present invention relates to a bearing with hardened rolling elements, hardened race and polymeric cage or retainer. In one embodiment the inventive bearing is used in a pump in which the drive source, or motor, is separated from the pump by a housing and is rotatably driven by the interaction of first and second magnets acting through the housing for use in pumping fluids at very cold temperatures, for instance, for use in pumping liquefied natural gas (LNG), which has a temperature of about −263° F. (−164° C.).

BACKGROUND OF THE INVENTION

Liquefied natural gas (LNG) and other very low temperature fluids are of increasing commercial importance. There is, therefore, a need for increased facility in handling, storing, and transporting such liquids. For example, LNG is being increasingly utilized as an alternative fuel source for internal combustion engines. Governmental regulations require that LNG be transported at pressures of about 30 psi, but to decrease the amount of LNG that is evaporated or otherwise lost from a stationary storage tank, it is common to store the LNG at pressures of 150 psi. When "bottled" for use as the fuel for an internal combustion engine, it is common to pressurize the LNG to pressures as high as 220 psi. Of course each increase in pressure requires that the LNG be pumped into either a storage tank or into a fuel tank at the next higher pressure such that successful use of LNG as an alternative fuel depends, in effect, upon reliable, safe and energy efficient pumping of high volumes of such fluids at very low temperatures.

Bearings used submerged in very low temperature fluids often operate without a source of lubrication flowing with the fluid. Oil and grease or other normal lubricants will not function at the very low temperatures. Graphite and other solid friction reducing materials wash away in the fluid and can unacceptably contaminate the fluid.

Pumps presently used for pumping low temperature fluids all suffer from a variety of disadvantages and limitations which limit their life, require frequent maintenance, and otherwise decrease their utility. This is particularly true when the temperature of the fluid must be very low. For instance, pumps that are currently available for pumping LNG, wear out quickly and need frequent maintenance and particularly require frequent replacement of the seals. Heretofore known seal-less pumps have not provided a satisfactory solution to this problems. For instance, magnetic drive pumps known in the fluid pump art, are not reliable for use at very low temperatures. Bonding material utilized on the magnets at low temperature nevertheless fails at very low temperature. In the case of LNG, severe problems result from the almost complete lack of lubrication that is provided by the LNG passing through the pump. As a result bearings wear rapidly and need frequent replacement. Sometimes rapid bearing wear leads to catastrophic pump failure.

It is, therefore, an object of the present invention to provide a pump for use at very low temperatures which is not limited by the disadvantages of known pumps. More specifically, it is an object of the present invention to provide an improved bearing for a seal-less magnetic drive pump for use in pumping at very low temperatures.

Another object of the present invention is to provide a bearing useful at very low temperatures used herein to mean temperatures lower than about −100° C. Yet another object of the present invention is to provide such a low temperature bearing which is self lubricated when used in a pump for pumping, high volumes of commonly utilized fluids as LNG and liquid nitrogen.

It is a further object to provide a bearing constructed for self lubrication when it is submerged in cryogenic fluid such as LNG and liquid nitrogen.

SUMMARY OF THE INVENTION

The objects, and the advantages, of the present invention are met by providing bearing that is useful in a magnetic drive pump for use in pumping fluids at very low temperature, below about −100° C. and more particularly for pumping cryogenic fluids at temperatures below about −150° C. The pump has a back plate with a rotatable shaft journaled therein. The rotatable shaft is journaled in one or more self-lubricating bearings comprising hardened rolling elements and races, such as balls and ball races sized for close tolerance rotation at very low temperatures and polymeric ball retainers or cages providing lubricity to the retained rolling elements at very low temperatures. While stainless steel rolling elements such as stainless steel balls will work, an improved combination provides ceramic rolling elements, particularly ceramic balls, retained with a polymeric cage for rolling in stainless steel races. An impeller of the pump is mounted to the first end of the shaft, and a casing is mounted to the second end of the shaft and a first magnet is contained within the pump casing mounted to the rotatable shaft. The pump casing is comprised of a material having a coefficient of thermal expansion that is greater than the coefficient of thermal expansion of the material comprising the magnet. The back plate is mounted within a housing having openings formed therein for intake of a fluid to be pumped at low pressure and an exhaust for output of the high pressure fluid and a second magnet is positioned in close proximity exterior to the housing for rotation therearound, the second magnet being adapted for mounting to the drive shaft of a motor or other drive source for rotating the second magnet around the housing, thereby rotating the first magnet within the housing to pump the fluid.

BRIEF DESCRIPTION OF THE DRAWINGS

The foregoing objects, advantages, and features, as well as other objects and advantages, will become more apparent with reference to the description, claims and drawings below, in which like numerals represent like elements and in which:

DETAILED DESCRIPTION OF THE PREFERRED EMBODIMENTS

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

Figure 1:
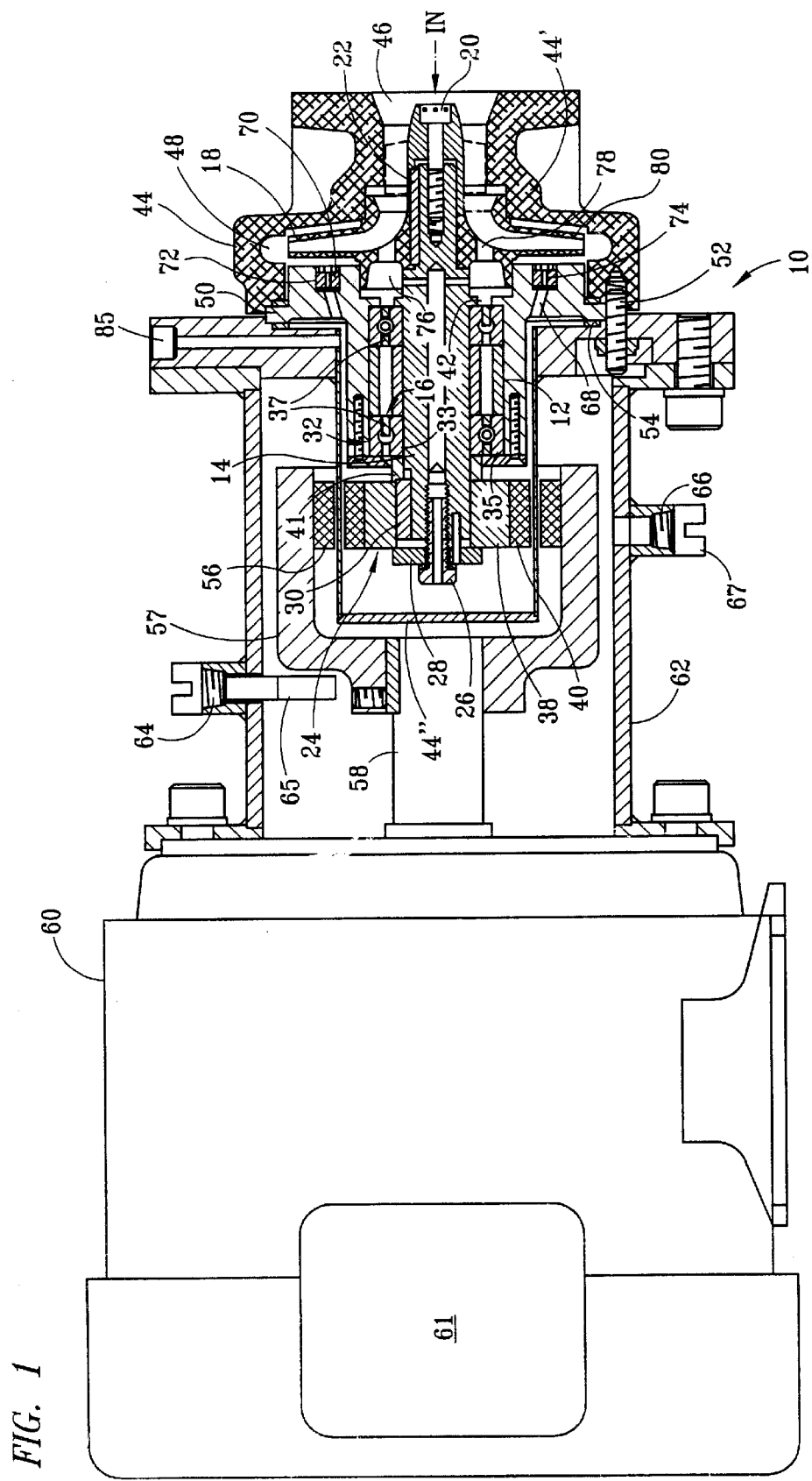
FIG. 1 is a longitudinal sectional view through a preferred embodiment of a pump constructed in accordance with certain teachings of the present invention.

A preferred embodiment of a pump constructed in accordance with the present invention will now be described with reference to FIG. 1 of the drawings. That pump, indicated generally at reference numeral 10, is comprised of a back plate 12 having a rotatable shaft 14 journaled in a ball bearing 16 therein. An impeller 18 is mounted to the first end of shaft 14 by a screw 20, a key 22 positioned in the key slots (not numbered) on the rotatable shaft 14 and impeller 18 preventing relative rotation therebetween. A first magnet 24 is mounted to the second end of rotatable shaft 14 by a screw 26 and jam nut 28, the key 30 and key slots (not numbered) formed in the second end of the rotatable shaft and the magnet 24 preventing relative rotation in the same manner as the key 22 prevents relative rotation between the rotatable shaft 14 and impeller 18.

As noted above, one of the objects of the present invention is to provide a seal-less pump which is self-lubricating so as to decrease the need for maintenance of the pump. For that purpose, the ball bearing 16 is comprised of one or more ball races 32 having balls 34 positioned therein with a ball retainer or a cage 37. The ball races 32 are comprised of an outer race 35 and an inner race 33. The balls 34 and the ball races 32 being comprised of a hardened material that is both hard and durable at very low temperatures, for example, heat treated 440 stainless steel could be used. In the preferred embodiment, the polymeric material of the cage 37 more specifically comprises a polymer having self-lubricating and "shared lubricating" properties. A polymeric material such as polyether ether ketone sometimes known as PEEK available from ICI America (New York, N.Y.) has been found to work for this purpose. The polymer is believed to act to lubricate itself and to lubricate other parts of the bearing through a property termed herein as "shared lubricating". The polymer must also avoid becoming unduly brittle at low temperature, it must also have sufficient durability and strength characteristics at low temperatures to function as a retainer or cage for the balls. Applicants have found these properties in the particular polymer, PEEK, and have found such polymer to be useful and particularly advantageous for purposes of this invention. It is theorized by applicants that the self lubrication and shared lubrication property resides in and results from minute wear particles or fine "dust" from the polymer such as PEEK, that roll, slide or otherwise "lubricate" both between the balls and the retainer for self-lubrication and also between the balls and the ball races for "shared lubrication". It is theorized that "dust" worn off the polymer surfaces of the cage 37 coats and becomes imbedded in micro pores of the hardened surfaces of the balls and races or otherwise attaches onto the surface of the stainless steel balls and on the stainless steel races. It may be recognize from this description that the combination of other polymers and hardened metal balls and races that will operate without brittle fracture below about −100° C. and that have similar self-lubricating and/or "shared lubricating" properties may likewise be suitable for this use without departing from the spirit of this invention.

Figure 4:
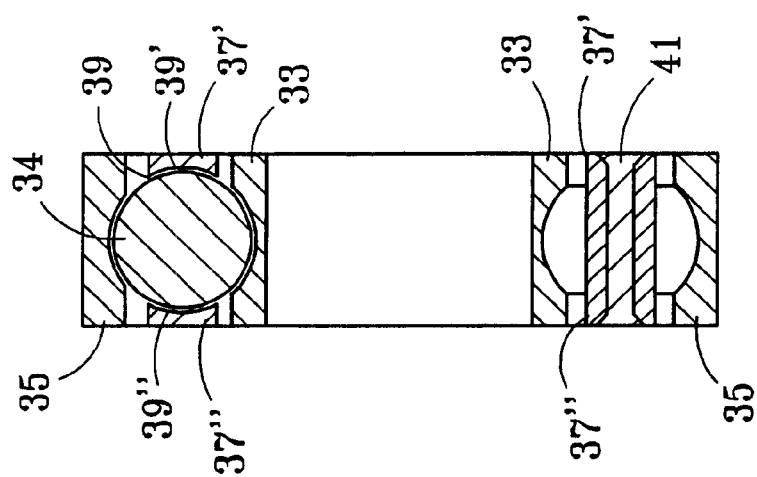
FIG. 4 is a section view of the bearing of FIG. 3 taken along section line 4—4 of a bearing having stainless steel balls, stainless steel rings and polymeric cage.
Figure 3:
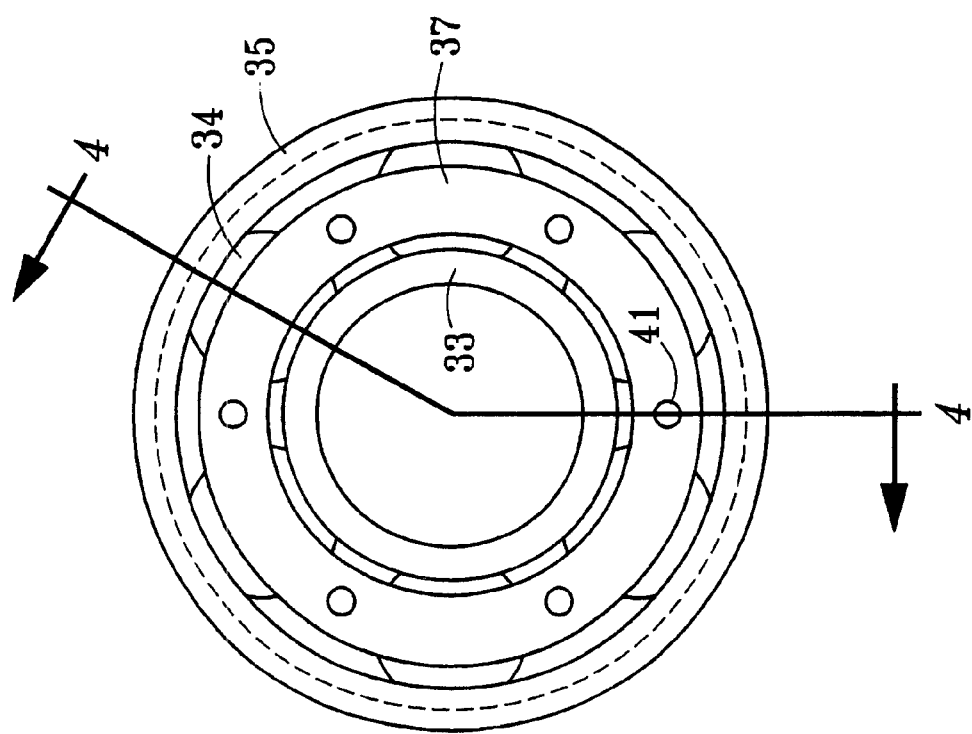
FIG. 3 is an enlarged side plan view of a ball bearing for use in a magnetic drive pump for pumping low temperature fluid according to one aspect of the present invention.

The construction of the bearing according to the present invention can be more fully understood with reference to FIG. 3, which is a side plan view of such a bearing as describe above, together with FIG. 4, which is a section view of the bearing of FIG. 3 taken along section line 4—4. The outer race 35 has a close tolerance grove as does the inner race 33. The balls 34 are held in rolling contact with the races at the low temperature of intended operation with close tolerance maintained by forming the races and the balls of the same material that is both hard and durable at the very low temperature of the fluid to be pumped. It has been found that 440 stainless steel is suitable for this purpose. The balls 34 are spaced and separated by cage 37, that may be formed of two circular shaped halves 37' and 37" with correspondingly positioned concave hemispherical segments 39' and 39" formed therein for defining spherical arc shaped cage chambers 39 for retaining the balls 34. The halves 37' and 37" are held together with fasteners 41, such as rivets, projecting through aligned holes and rigidly secured between the halves.

Figure 6:
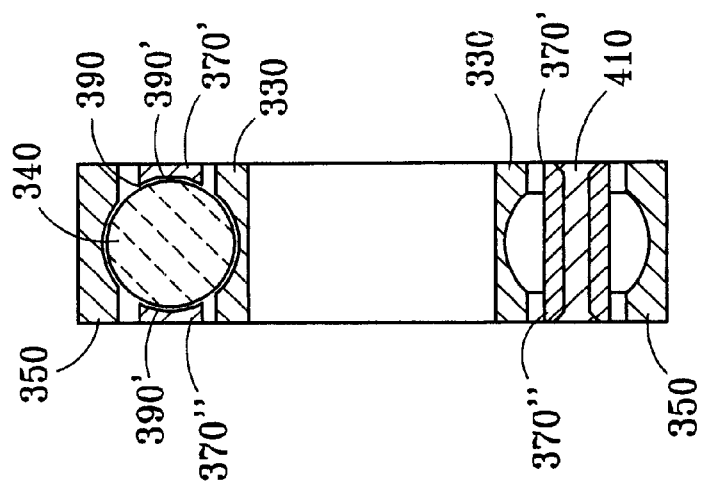
FIG. 6 is a section view of the bearing of FIG. 5 taken among section line 6—6.
Figure 5:
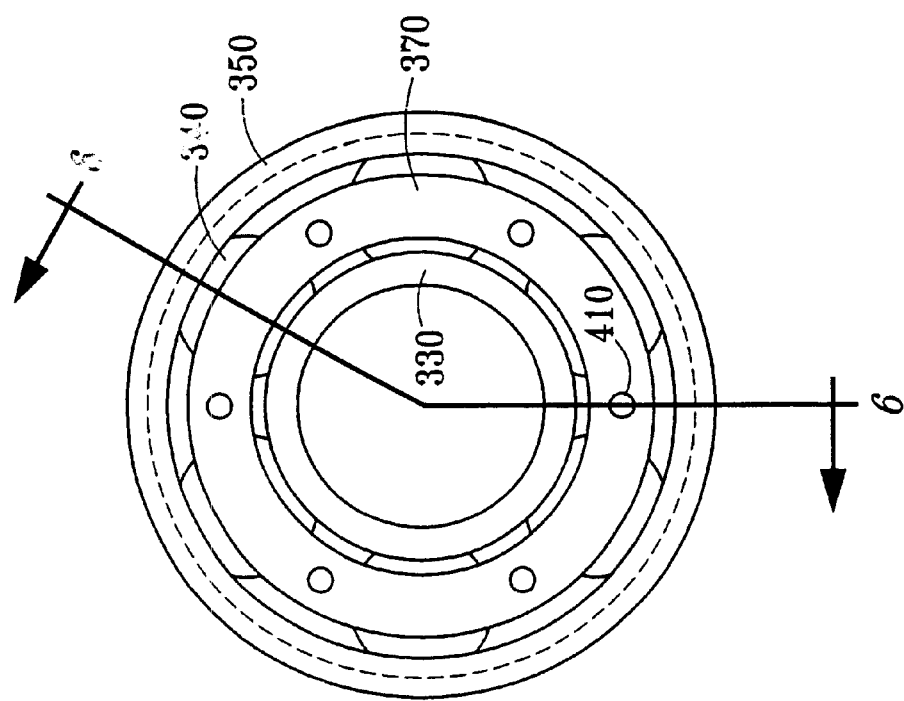
FIG. 5 is a section view of an enlarged bearing having steel races, ceramic balls and a polymeric cage according to one embodiment of the invention.

In a further discovery it has been found that a bearing for use submerged in a cryogenic fluid can also uniquely be constructed to be self lubricating, with ceramic balls, as depicted in FIGS. 5 and 6.

FIG. 5 is a side view of a bearing with ceramic balls, stainless steel races and a polymeric cage. FIG. 6 is a cross sectional view taken along section line 6—6 of FIG. 5. The outer race 350 has a close tolerance grove as does the inner race 330. The balls 340 are held in rolling contact with the races at the low temperature of intended operation with close tolerance maintained by forming the races of stainless steel and the balls of ceramic material having compatible thermal expansion characteristics and a ceramic material that is both hard and durable at the very low temperature of the fluid to be pumped. The balls 340 are spaced and separated by a retainer or cage 370, that may be formed comprising a polymeric material that provides lubrication to the bearing. The construction of the cage 370 may, for example, comprise two generally circular shaped halves 370' and 370" with correspondingly positioned concave hemispherical segments 390' and 390" formed therein for defining spherical arc shaped cage chambers 390 for retaining the balls 340. The halves 370' and 370" are held together with fasteners 410, such as rivets, projecting through aligned holes and rigidly secured between the halves. In particular it has been found that cages made from or coated with PEEK will provide self lubrication between the ceramic balls and cage and shared lubrication between the balls and the races.

It has been theorized that the minute poracity of the ceramic balls uniquely facilitate the lubrication provided by the minute particles or fine "dust" worn from the cage during use. Whether the porocity facilitates the continuous wearing of the cage to provide the fine dust, provides sites in the pores for the particles to lodge, or both is not yet known. However, in theory both modalities can be present to unique advantage. The thermal shrinkage characteristics of ceramic balls is not a problem where the composition of the ceramic balls and the relative sizes between the balls the races and the cage are properly adjusted to minimize the effect of the respective thermal coefficients of expansion for each of the components.

Also as noted above, a problem arises with the use of magnetic drive pumps as a result of the use of the pump at very cold temperatures in that the material comprising the magnet is unable to withstand the cold temperatures. In more detail, it is the material which bonds (or "pots") the magnetic material comprising the magnet 24 to the carrier 38 which fails at cold temperatures rather than the magnetic material itself. One such material is sold as part of the magnet and carrier assemblies commercially available under the brand name CHEMREX by Ugimag, Inc. (Valparaiso, Ind.). To overcome that limitation of prior art magnetic drive pumps, the magnet 24 of pump 10 is provided with a casing 40 which encases the magnetic material of magnet 24. Magnet 24 is carried on rotatable shaft 14 and is trapped between the jam washer 28 and the spacer 41. The spacer 41, in turn, traps the ball races 32 against the shoulder 42 formed on shaft 14. In the preferred embodiment, the casing 40 is comprised of a metallic or other material having a coefficient of thermal expansion which is greater than that of the material 36 comprising the magnet 24 so that, as temperature decreases, the material comprising casing 40 contracts at a rate faster than the rate of contraction of the material 36 comprising the magnet 24 so that the material 36 is held tightly in place on rotatable shaft 14. The magnitude or rate of thermal contraction corresponds to the magnitude of the coefficient of thermal expansion. Thus, for a casing that fits tightly on the E magnet at room temperature (i.e., both the magnet and the casing are expanded) the casing will contract faster for each degree that the temperature drops when exposed to cryogenic fluid and the casing will therefore fit tighter on the magnet when operating the magnet 24 of pump 10 is provided with a casing 40 which encases the magnetic material of magnet 24. Magnet is carried on rotatable shaft 14 and is trapped between the jam washer 28 and the spacer 41. The spacer 41, in turn, traps the ball races 32 against the shoulder 42 formed on shaft 14. In the preferred embodiment, the casing 40 is comprised of a metallic or other material having a coefficient of thermal expansion which is greater than that of the magnetic material comprising the magnet 24 so that, as temperature decreases, the material comprising casing 40 contracts at a rate faster than the rate of contraction of the magnetic material comprising the magnet 24 so that the magnetic material of magnet 24 is held tightly in place on rotatable shaft 14. The magnitude or rate of thermal contraction corresponds to the magnitude of the coefficient of thermal expansion. Thus, for a casing that fits tightly on the magnet at room temperature (i.e., both the magnet and the casing are expanded) the casing will contract faster for each degree that the temperature drops when exposed to cryogenic fluid and the casing will therefore fit tighter on the magnet when operating to pump very low temperature fluids.

Back plate 12 is mounted within a housing 44 having openings formed therein for intake 46 and volute chamber 48, respectively, of the fluid to be pumped through pump 10. In the preferred embodiment shown in FIG. 1, the back plate 12 is provided with a flange 50 which is confined between the front and back halves 44' and 44" of housing 44 by pump screws 52 (only one of which is seen in the view shown in FIG. 1). Shoulders (not numbered) being provided for appropriately sized gaskets 54 for sealing the two halves 44' and 44" to the flange 50. The front interior half 44" of housing 44 forms the volute of pump 10.

A second magnet 56 is positioned in close proximity to the housing 44 for rotation therearound and is adapted, as with a concave coupler 57 and a corresponding cylindrical shape, for mounting to a drive shaft 58 of a motor 60. When the motor 60 is operated, the first magnet 24 within the housing 44 is rotated under the magnetic influence of second magnet 56 transferred through housing 44, to drive the rotatable shaft 14 and the impeller 18.

In a preferred embodiment, a frequency inverter 61 is uniquely used with the pump to not as with normal use of a frequency inverter which is to vary the speed of the motor from its standard maximum rated speed to slower speeds, but to increase the speed of the pump from the maximum standard of 3600 rpm to about 7200 rpm. This advantageously accomplishes the increased speed desired for low temperature fluid pumping simply and without the use of pulleys and a V-belt as known in the art. This increase in the speed of the motor facilitates the increase in the pressure of the fluid from pumping because head pressure is proportional to the square of the impeller speed. In the embodiment shown in FIG. 1, a jacket 62 is bolted between the back half 44" of housing 44 and the motor 60 for enclosing the second magnet 56. Jacket 62 is provided with an inlet and outlet 64 and 66, respectively, for purging of fluids therethrough to eliminate around housing 44 any fluids such as liquid water, water vapor, or other constituents of ambient air that will freeze at the very low temperatures resulting at housing 44 due to very low temperature fluid being pumped therein. The purging with a dry and contaminant free fluid advantageously prevents the formation of water ice (or other frozen constituents of ambient air) around the housing 44 and between the magnets 56 and housing 44. Alternatively, as shown in hidden lines in FIG. 1, opening 66 may be closed, as with cap 67, and a desiccant material 65 may be enclosed within jacket 62, as through opening 64, to absorb water so that no moisture is allowed to condense on the moving parts inside the jacket 62, which could freeze up the motor 60. In one preferred embodiment, the desiccant 65 may be made periodically replaceable, as by threading it into opening 64, to maintain functional drying throughout the life of the pump.

As a preventative measure to reduce the formation of areas of temperature variation and mechanical size variation caused by thermal expansion, the fluid being pumped through pump 10 is circulated within the housing 44. This interior circulation is accomplished by provision of a passage 68 in back plate 12 having a plug 70 positioned in a well 72 formed therein, the plug 70 having an orifice 74 therethrough. The orifice 74 and passage 68 allow high pressure fluid to pass from the volute formed inside the front half of housing 44' through the back plate 12 to the back half of housing 44" until sufficient back pressure builds behind back plate 12 to cause the fluid to return to the intake 46 of housing 44". Return to the intake 46 is through the hollow shaft 14 and along the outside of the shaft 14 through the ball bearings 16 into the chamber 76 which connects through the hole 78 formed near the base of the blades 80 comprising impeller 18 (e.g., in the lower pressure portion of the volute).

Figure 2:
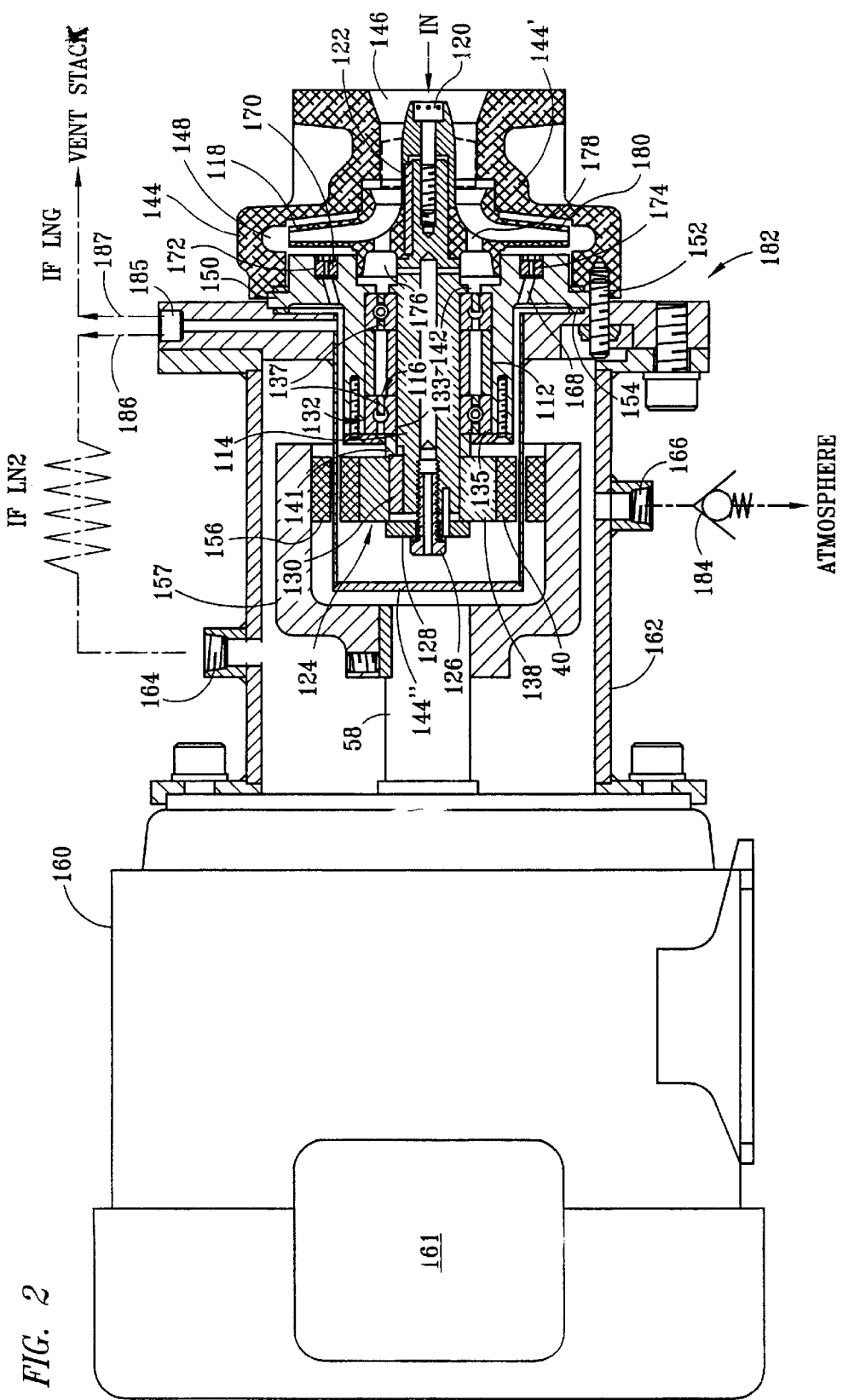
FIG. 2 is a sectional view similar to FIG. 1 of an alternative embodiment of the apparatus of the present invention.

Referring to FIG. 2, a second alternative embodiment of the pump of the present invention is indicated generally as reference numeral 182. In this second embodiment, all the component parts thereof are similar to those of the embodiment shown in FIG. 1 and are numbered with the same reference numeral preceded with a "1," e.g., impeller 18 in FIG. 1 corresponds generally to impeller 118 in FIG. 2. Pump 182 is particularly intended for use with those fluids such as liquid nitrogen which can be vented to the atmosphere and circulates the fluid being pumped internally in the same manner as does pump 10 in FIG. 1, but also provides a check valve 184 through which a portion of the pumped fluid is passed to the atmosphere through a vent tube 185 from the back half 144" of housing 144. Where the pumped fluid is known to be free of water moisture and other materials that might freeze at the low temperature of the fluid to being pumped, the vented fluid can also alternatively be captured as a purging fluid by a line 186 (shown in shadow lines to indicate that it is optional) and, which line 186 is constructed to act as a vaporizer to assure that the vented fluid is converted into warm purge gas, circulated into the inlet 164 and through the jacket 162 for the purpose of purging the jacketed volume 163 of any moisture capable of freezing. If the fluid being pumped is LNG, the pumped fluid vented through vent 185 can also be routed through a line 187 to a stack (not shown) for burning or otherwise for safe disposal or recycling of it.

Although described in terms of the above-illustrated preferred embodiments, those skilled in the art who have the benefit of this disclosure will recognize that many changes can be made to the component parts of the illustrated embodiments which do not change the manner in which these parts function to achieve their intended advantageous results. For instance, in the event that a potting material is found for bonding the magnetic material of the first magnet 24 at very low temperatures, it is not necessary that the magnetic material be encased in the casing 40 for them to function for their intended purpose. Further, depending upon the working environment of the pump 182 and other factors known in the art, it may not be necessary to circulate moisture free purging fluid through the jacket 162 and certainly the purging fluid can be circulated through the jacket 162 in different routes. These and all other such changes are intended to fall within the spirit of the present invention as defined by the following claims.

What is claimed is:

1. A magnetic drive pump for use in pumping a very low temperature fluid at less than about −100 degrees centigrade comprising:

a back plate having a rotatable shaft journaled therein said rotatable shaft having a first end and a second end journaled in a bearing comprised of a hardened race in said back plate, a plurality of ceramic rolling elements in said race, and a retainer comprised of a polymeric material holding said rolling element is spaced apart position about said race;

an impeller mounted to a first end of said rotatable shaft;

a first magnet comprising a first material having coefficient of thermal expansion mounted to a second end of said rotatable shaft and contained within a casing mounted to said rotatable shaft, said casing comprising a material having a second coefficient of thermal expansion greater than the first coefficient of thermal expansion of the material comprising said magnet;

said back plate being mounted within a housing having openings formed therein for intake and exhaust of a fluid to be pumped at very low temperature; and a second magnet positioned in close proximity to said housing for rotation therearound and adapted for mounting to the shaft of a motor for rotating said first magnet in the housing.

2. The pump of claim 1 wherein the polymeric material comprising said retainer of said bearing is comprised of a polymer having self-lubricating properties.

3. A pump as in claim 2 wherein said polymeric material of said retainer comprises polyether ether ketone.

4. A pump as in claim 3 wherein said races are comprised of 440 stainless steel and said retainer is comprised of polyether ether ketone.

5. A pump as in claim 4 wherein said rolling elements are hardened balls and said retainer further comprises:

a first circular shaped half having a predetermined number of semispherical segment concave cutouts evenly spaced therearound and partially into one side of said first circular shaped half;

a second circular shaped half having said predetermined number of concave cutouts evenly spaced therearound and partially into one side of said second circular shaped half; and a plurality of connectors through said first and second halves for holding said halves together with said plurality of balls held in said semispherical segment concave cutouts held together to form spherical segment ball retainer openings.

6. The pump of claim 1 additionally comprising a jacket mounted to said housing for enclosing said second magnet and having an inlet and an outlet formed therein for circulation of fluids therethrough.

7. The pump of claim 1 having an orifice formed in said back plate for circulation of fluid within said housing for preventing the formation of air pockets.

8. The pump of claim 7 additionally comprising an outlet formed in said housing for venting circulating fluid from said housing.

9. The pump of claim 8 additionally comprising a jacket mounted to said housing for enclosing said second magnet and having an inlet and an outlet formed therein for circulation of fluids therethrough.

10. The pump of claim 9 additionally comprising a connection between the outlet from said housing and the inlet of said jacket.

11. The pump of claim 1 additionally comprising a frequency inverter for increasing the speed of the motor rotating said first magnet.

12. A magnetic drive pump for pumping a fluid at very low temperature having an impeller mounted on a rotatable shaft journaled in a pump housing comprising said shaft being journaled in a ball bearing said ball bearing further comprising a ball race a plurality of ceramic balls and a ball retainer, wherein said ball retainer comprises a polymeric material having self-lubricating properties in fluid at said very low temperatures.

13. The magnetic drive pump of claim 12 wherein said polymeric comprises polyether ether keytone (PEEK).

14. A bearing for self-lubricating use submerged in a cryogenic fluid, said bearing comprising:

a) an inside race comprising stainless steel, b) an outside race comprising stainless steel c) a plurality of rolling elements sized for rolling engagement between said inside race and said outside race, d) a polymeric cage holding said rolling elements spaced apart for rolling between said races.

15. A bearing as in claim 14 wherein said polymeric cage comprises PEEK.

16. A bearing as in claim 15 wherein said plurality of rolling elements comprise ceramic rolling elements.

17. A bearing as in claim 16 wherein said plurality of ceramic rolling elements comprise balls.

18. A bearing as in claim 15 wherein said plurality of rolling elements comprise stainless steel.

19. A bearing as in claim 18 wherein said plurality of said stainless steel rolling elements comprise balls.

20. A self-lubricating bearing for use submerged in cryogenic fluid comprising:

a) an inside race comprising stainless steel;

b) an outside race comprising stainless steel;

c) a plurality of ceramic balls sized for rolling engagement between said inside race and said outside race; and d) a polyether ether ketone cage holding said ceramic balls spaced apart for rolling between said races.

* * * * *